United States Patent
Grasreiner et al.

(10) Patent No.: US 11,401,881 B2
(45) Date of Patent: Aug. 2, 2022

(54) FOURIER DIAGNOSIS OF A CHARGE CYCLE BEHAVIOR OF AN INTERNAL COMBUSTION ENGINE

(71) Applicant: Bayerische Motoren Werke Aktiengesellschaft, Munich (DE)

(72) Inventors: Sebastian Grasreiner, Munich (DE); Florian Hartl, Munich (DE); Christian Kuklinski, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/049,478

(22) PCT Filed: May 15, 2019

(86) PCT No.: PCT/EP2019/062398
§ 371 (c)(1),
(2) Date: Oct. 21, 2020

(87) PCT Pub. No.: WO2019/238339
PCT Pub. Date: Dec. 19, 2019

(65) Prior Publication Data
US 2021/0087994 A1    Mar. 25, 2021

(30) Foreign Application Priority Data

Jun. 11, 2018 (DE) .............. 10 2018 209 253.2

(51) Int. Cl.
*F02D 41/22* (2006.01)
*F02D 41/14* (2006.01)
*F02D 41/28* (2006.01)
*G01M 15/11* (2006.01)

(52) U.S. Cl.
CPC ......... *F02D 41/22* (2013.01); *F02D 41/1498* (2013.01); *F02D 41/28* (2013.01);
(Continued)

(58) Field of Classification Search
CPC ............ G01M 15/11; F02D 41/22–222; F02D 2041/223–228; F02D 41/1495; F02D 41/1497–1498
(Continued)

(56) References Cited

U.S. PATENT DOCUMENTS 5,576,963 A * 11/1996 Ribbens ................. G01M 15/11
                                                                    123/436
5,909,724 A   6/1999 Nishimura et al.
(Continued)

FOREIGN PATENT DOCUMENTS

CA      2099613 A1    6/1992
CN    102052176 A     5/2011
(Continued)

OTHER PUBLICATIONS

International Search Report (PCT/ISA/210) issued in PCT Application No. PCT/EP2019/062398 dated Sep. 11, 2019 with English translation (six (6) pages).
(Continued)

*Primary Examiner* — Robert A Werner
(74) *Attorney, Agent, or Firm* — Crowell & Moring LLP

(57) ABSTRACT

A diagnostic tool diagnoses a charge cycle behavior of an internal combustion engine with a plurality of cylinders. The diagnostic tool ascertains a rotational speed profile of the internal combustion engine. From the determined rotational speed curve, the diagnostic tool ascertains a peculiarity of at least one charge exchange characteristic variable by performing a Fourier transform. The diagnostic tool assigns a deviation type to the rotational speed profile as a function of the ascertained peculiarity of the charge exchange characteristic variable.

16 Claims, 3 Drawing Sheets

(52) U.S. Cl.
CPC ....... *G01M 15/11* (2013.01); *F02D 2041/288* (2013.01); *F02D 2200/101* (2013.01)

(58) Field of Classification Search
USPC ..... 701/111, 114; 73/114.02, 114.04, 114.07
See application file for complete search history.

(56) References Cited

U.S. PATENT DOCUMENTS

| | | | |
|---|---|---|---|
| 2002/0148441 A1 | 10/2002 | Tuken | |
| 2003/0089338 A1 | 5/2003 | Remele et al. | |
| 2008/0120018 A1 | 5/2008 | Wiles | |
| 2008/0190184 A1* | 8/2008 | Walters | G01M 15/11 73/114.02 |
| 2013/0160536 A1* | 6/2013 | Majima | G01M 15/11 73/114.11 |
| 2017/0166190 A1* | 6/2017 | Eo | B60K 6/485 |
| 2020/0063674 A1 | 2/2020 | Braun et al. | |

FOREIGN PATENT DOCUMENTS

| | | |
|---|---|---|
| DE | 10 2005 047 829 B3 | 5/2007 |
| DE | 10 2007 002 740 A1 | 7/2008 |
| DE | 10 2008 054 215 A1 | 5/2010 |
| DE | 10 2009 045 303 A1 | 4/2011 |
| DE | 10 2011 005 577 B3 | 7/2012 |
| DE | 10 2007 053 783 B4 | 8/2015 |
| DE | 10 2016 222 533 A1 | 5/2018 |
| JP | 9-264183 A | 10/1997 |
| WO | WO 94/19670 A1 | 9/1994 |
| WO | WO 2007/063177 A1 | 6/2007 |

OTHER PUBLICATIONS

German-language Written Opinion (PCT/ISA/237) issued in PCT Application No. PCT/EP2019/062398 dated Sep. 11, 2019 (six (6) pages).

German-language Office Action issued in German Application No. 10 2018 209 253.2 dated Jan. 11, 2019 with English translation (10 pages).

German-language Decision to Grant issued in German Application No. 10 2018 209 253.2 dated Feb. 13, 2020 with English translation (10 pages).

Chinese-language Office Action issued in Chinese Application No. 201980026221.7 dated Apr. 6, 2022 with English translation (19 pages).

* cited by examiner a)

b)

c)

a)

b)

FOURIER DIAGNOSIS OF A CHARGE CYCLE BEHAVIOR OF AN INTERNAL COMBUSTION ENGINE

BACKGROUND AND SUMMARY OF THE INVENTION

The present subject matter relates to a method and a diagnostic tool for the diagnosis of charge exchange behavior of an internal combustion engine, and to an internal combustion engine with multiple cylinders with a diagnostic tool of said type.

Rough engine running and misfiring are a fundamental problem in internal combustion engines, which can lead at least to an erroneous build-up of the propulsion torque. The fact that an erroneous build-up of torque is occurring can generally be observed from the output variable of the engine rotational speed, i.e., from the rotational speed development of the crankshaft.

However, the mere knowledge that a fault of some kind is present is normally not sufficient to provide a remedy. To eliminate the fault, positive diagnosis of the malfunction is necessary, wherein the causes of misfiring and/or rough engine running may differ widely.

With present diagnostic systems, an accurate diagnosis is highly complex and requires various items of information from different subsystems of the internal combustion engine. Even a distinction between mechanical problems in the cylinder (for example in the tribological pairing), on the one hand, and problems in terms of the gas charging (charge exchange) or in the air path, on the other hand, is difficult to establish during a workshop visit by the customer with the functionally impaired engine.

A workshop visit with a rough-running engine can therefore be disappointing for the customer with regard to the likelihood of success in attaining an accurate first diagnosis.

Against this background, it is an object of the present subject matter to make possible improved identification of a fault causing rough engine running (i.e., engine running changed in relation to a setpoint) and/or misfiring, and to provide improved diagnosis of charge exchange behavior of an internal combustion engine with multiple cylinders.

According to one aspect of the present subject matter, a method for diagnosing charge exchange behavior of an internal combustion engine with multiple cylinders is provided, which method is suitable for identifying a fault causing rough engine running and/or misfiring. The method has at least the following steps:

a) Ascertaining a rotational speed profile of the internal combustion engine. A rotational speed profile is to be understood in the present case to mean a development of the rotational speed versus a crank angle of the crank drive of the internal combustion engine and/or versus the time. In an embodiment, a profile of the rotational speed over a predetermined diagnosis time window is ascertained which has a fine resolution with respect to time and/or versus the crank angle. This diagnosis time window is preferably one working cycle of the internal combustion engine, i.e., two revolutions of the crank drive or that crank angle or time segment in which each of the cylinders of the internal combustion engine runs through all strokes of the four-stroke process. It is however also possible for multiple working cycles to be provided as a diagnosis time window.

b) Ascertaining a peculiarity of at least one charge exchange characteristic variable using a Fourier transformation from the ascertained rotational speed profile. An amplitude of an engine order ascertained using the Fourier transformation and/or an amplitude difference between an ascertained and a predetermined amplitude, the latter for example being stored in an operation model, can be a charge exchange characteristic variable.

c) Assigning a deviation type to the rotational speed profile as a function of the ascertained peculiarity of the charge exchange characteristic variable. In the present case, a deviation type is to be understood to mean a predetermined peculiarity of the rotational speed profile and/or of the Fourier transformation of the rotational speed profile, which is assigned to a fault type which leads to changed engine running and/or misfiring. Here, different predetermined rotational speed profiles and/or Fourier transformations of the predetermined rotational speed profiles are assigned to different deviation types, such as for example a leakage in the intake air system. According to an embodiment, for the assignment of the deviation type, the following steps are performed:

c1) Comparing the ascertained peculiarity of the charge exchange characteristic variable with predetermined peculiarities of the charge exchange characteristic variable which are assigned to different deviation types. A setpoint-actual value comparison is performed between the ascertained peculiarity and previously ascertained peculiarities which are regarded as representative of different fault types which result in rough engine running and/or misfiring.

c2) Assigning a deviation type to the rotational speed profile (101) in accordance with the result of the comparison. A deviation type is assigned if the comparison has yielded a sufficient correlation—which is to be specified in accordance with routine considerations—between the ascertained peculiarity and a predetermined peculiarity of the charge exchange characteristic variable.

According to an embodiment, for the ascertainment of the comparison result, the following steps are performed:

c2.i) Calculation of a difference between the ascertained peculiarity and the predetermined peculiarity. For one or more operating points of the internal combustion engine, an engine order analysis can be performed using the Fourier transformation, and the ascertained amplitude for a suborder can be compared with a predetermined amplitude for a deviation type or fault type in the sense of the calculation of a difference.

c2.ii) Assigning a deviation type to the rotational speed profile if the difference exceeds a predetermined threshold value, which is in particular assigned to a particular deviation type. For multiple operating points of an operation map, it can be determined in each case whether an amplitude difference exceeds a threshold value.

The result is then in particular a rough statement regarding the area in which the fault causing the rough engine running and/or the misfiring lies; for example, as a result of the method, it is possible to distinguish whether the deviation or the fault can be assigned to piston friction, to a preparation of a combustion mixture or to a feed of fresh air and/or recirculated exhaust gas. Furthermore, using a process of elimination, it is also possible to specify areas of the causal fault where the fault is suspected not to lie.

According to a further aspect of the present subject matter, a diagnostic tool for the, on-board, diagnosis of charge exchange behavior of an internal combustion engine, of a four-stroke internal combustion engine, with multiple, four, cylinders, is provided, which diagnostic tool serves for identifying a fault causing rough engine running and/or misfiring. The diagnostic tool has at least one acquisition unit, which is configured to acquire a rotational speed of a crankshaft of the internal combustion engine, a corresponding sensor unit and/or access to a stored suitable operation model.

Furthermore, the diagnostic tool has a processing unit which is at least configured i) to control the acquisition unit. The processing unit is additionally configured ii) to ascertain a peculiarity of at least one charge exchange characteristic variable using a Fourier transformation from an ascertained rotational speed profile, and to assign a deviation type to the rotational speed profile in a manner dependent on the ascertained peculiarity of the charge exchange characteristic variable.

According to a further aspect of the present subject matter, an internal combustion engine with multiple, for example, three, four or six cylinders is provided, which has at least one diagnostic tool according to an embodiment of the present subject matter.

The present subject matter is particularly easy to implement in an internal combustion engine with four cylinders, which is in the form of a four-stroke internal combustion engine, owing to the isochronal alternation between the individual strokes of the various cylinders. Other numbers of cylinders are of course also possible in other embodiments.

The present subject matter is based inter alia on the consideration that the cycles of a four-stroke internal combustion engine (intake, compression, working cycle, exhaust) overlap in terms of time between the individual cylinders—they occur in parallel with one another in different cylinders.

The present subject matter is now based inter alia on the concept of ascertaining information relating to the presumed deviation type or fault type independently of the rotational speed dropout and of an individual cylinder, but nevertheless based on a rotational speed profile of the internal combustion engine to be able to continue to utilize the existing capability for rotational speed acquisition.

The approach according to the present subject matter, of performing an engine order analysis from the ascertained rotational speed profile of the internal combustion engine using a Fourier transformation and extracting the charge exchange characteristic variable from this order analysis, permits an assignment of deviation types or fault types at least for fault causes which go beyond a single cylinder. For example, with such a method, it is possible, based on the amplitude (as charge exchange characteristic variable) of an order in the ascertained order analysis, to ascertain a difference between the ascertained amplitude and a predetermined deviation type amplitude which is assigned to a deviation type.

A deviation type can be assigned if the comparison of the two amplitudes yields an amplitude difference which exceeds a certain threshold value. In this way, it is for example possible to identify a fault which is to be assigned to the deviation type of a leakage in the intake air system.

Different deviation type amplitudes may be stored for different deviation types and/or for different operating points of the internal combustion engine may be stored in each case in an operation model, for example in the engine controller. Different threshold values for the amplitude difference to be applied for different deviation types and/or for different operating points of the internal combustion engine may be stored in each case in an operation model, for example in the engine controller.

This makes it possible to roughly localize the fault causing rough engine running and/or misfiring to these predetermined deviation types (in the present case also referred to as fault types). Deviation types or fault types may for example be: 1) insufficient or excessive charging of the cylinder with fresh air and/or recirculated exhaust gas; 2) insufficient compression of the cylinder; 3) excessive mechanical friction in the cylinder; 4) premature ignition and/or other irregular combustion.

With the rotational speed acquisition, for this purpose, use is made of existing sensor tool (rotational speed acquisition) with enhanced functions. The capabilities of the existing rotational speed acquisition at the engine, at the crankshaft, have hitherto not been utilized to perform such a rough classification of the causal faults.

The present subject matter makes it considerably easier to establish causes for rough running problems including misfiring, by identification of the problem in the gas charging (charge exchange) or a blockage of the air path.

Online data acquisition of the diagnosis results during driving operation, which is to be performed according to an embodiment, makes it possible for the workshop to access real driving situations and thus in particular permits a more directed execution of servicing operations and/or a faster execution of maintenance work. Because of the latter, this gives rise to lower warranty costs, greater customer satisfaction and/or fewer repeat repairs.

According to various embodiments of the present subject matter, diagnostic methods are possible based on different charge exchange characteristic variables.

To obtain a reliable diagnosis signal based on a rotational speed profile, it is provided according to an embodiment, for the ascertainment of the rotational speed development, that a continuous rotational speed profile (i.e., a rotational speed profile ascertained in very short time intervals) is ascertained, or measured, during the diagnosis time window.

The ascertained rotational speed profile can be used as charge exchange characteristic variable.

The characteristics of the Fourier transformation thus ascertained, in the frequency domain over the various engine orders, may subsequently be compared with the characteristics of corresponding Fourier transformations which are assigned to fault types.

This implementation of an analytical method in the frequency domain can, above a mean engine load and up to high rotational speeds, be used effectively if a significant air mass flow is present in the air feed. For example, a high pressure is present in the intake pipe, and said implementation is based on a signal analysis of the rotational speed using a Fourier analysis and feature formation. The high pressure must be present in the system for this implementation, because otherwise it is also the case that no elevated back pressure prevails on the exhaust gas side. For the compensation of the leakage losses, for example in a system with exhaust-gas turbocharging, more exhaust-gas enthalpy is demanded. A pressure adaptation that may be required can be controlled in closed-loop fashion using the wastegate actuator.

According to an embodiment, using the DFT and/or FFT calculation, and amplitude difference of an engine order is ascertained and used for the identification of a deviation type, using a comparison of the ascertained difference with stored values.

In order to be able to perform the diagnosis advantageously on the basis of a multiple of the basic excitation frequency of the engine on which diagnosis is being performed, it is provided according to an embodiment that, as charge exchange characteristic variable, an amplitude of a particular engine order—in the case of a four-cylinder engine, in particular the amplitude of the 12th engine order—is ascertained and used for the assignment of a deviation type.

Depending on whether the optimization of the required processing power or absolute accuracy is of primary importance in an operating situation, it is provided according to various embodiments that the peculiarity of the charge exchange characteristic variable is ascertained using a DFT and/or FFT calculation.

To ascertain a sufficient dataset for a sufficiently accurate diagnosis, it is provided according to an embodiment that the rotational speed profile during a diagnosis time window, which in particular corresponds to at least one working cycle of the four-stroke internal combustion engine, that is to say at least two revolutions of the crankshaft, is ascertained.

According to an embodiment, the diagnostic tool is, for the assignment of the deviation type, configured to compare the ascertained peculiarity of the charge exchange characteristic variable with predetermined peculiarities of the charge exchange characteristic variable which are assigned to different deviation types, and to assign a deviation type to the rotational speed profile in accordance with the result of the comparison.

According to an embodiment, the diagnostic tool is, for the ascertainment of the comparison result, configured to calculate a difference between the ascertained peculiarity and the predetermined peculiarity, and to assign a deviation type to the rotational speed profile if the difference exceeds a predetermined threshold value.

An example use of a method according to an embodiment of the present subject matter is illustrated as an example embodiment in the description of the figures.

Further features, advantages and possible uses of the present subject matter will emerge from the following description in conjunction with the figures.

BRIEF DESCRIPTION OF THE DRAWINGS

FIG. 1a illustrates the installation environment of the internal combustion engine.

FIG. 1b illustrates relevant parameters.

FIG. 1c illustrates torque contributions to the crank drive of the internal combustion engine versus the time.

FIG. 2b is an illustration of an engine order analysis versus this rotational speed profile, in each case for a fault-free operating state and for an operating state with a leakage of the supercharging air system.

DETAILED DESCRIPTION OF THE DRAWINGS

Figure 1:
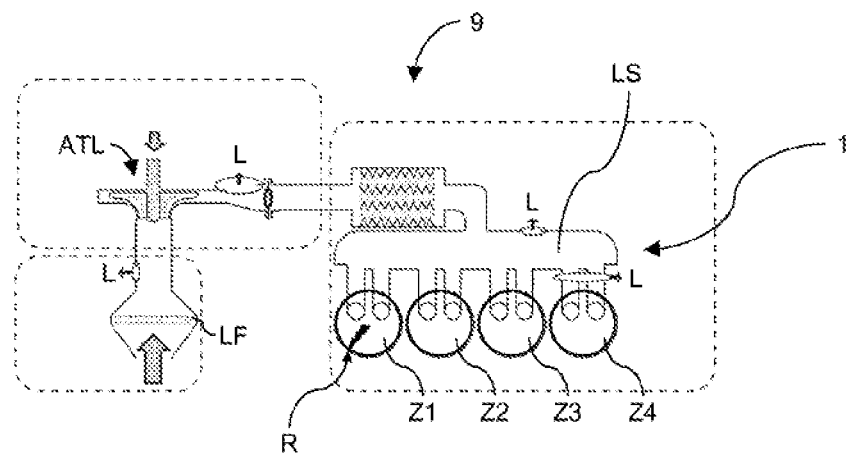
FIGS. 1a-1c show, in schematic views, an internal combustion engine with a diagnostic tool according to an example embodiment of the present subject matter.
Figure 1:
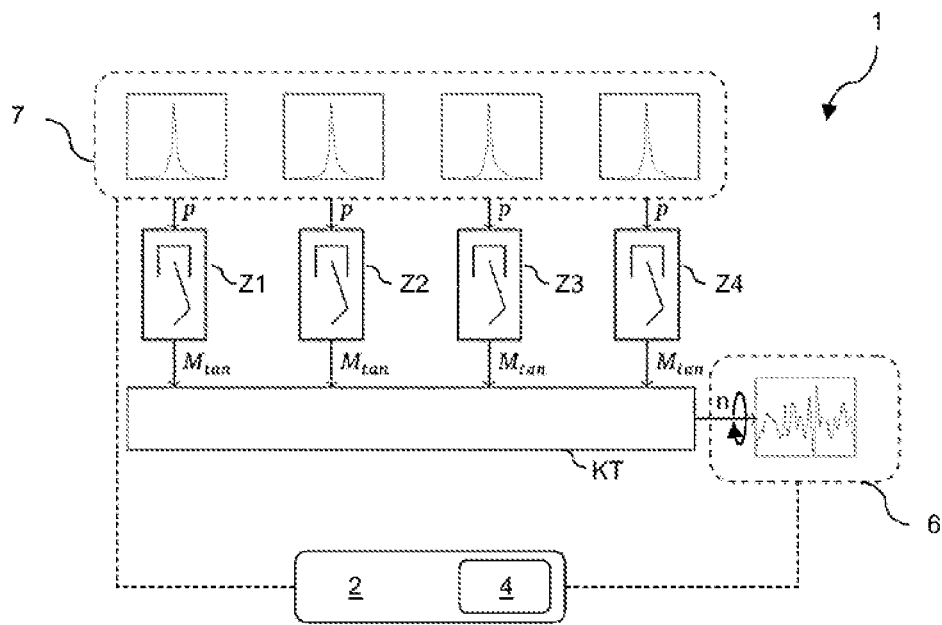
Figure 1:
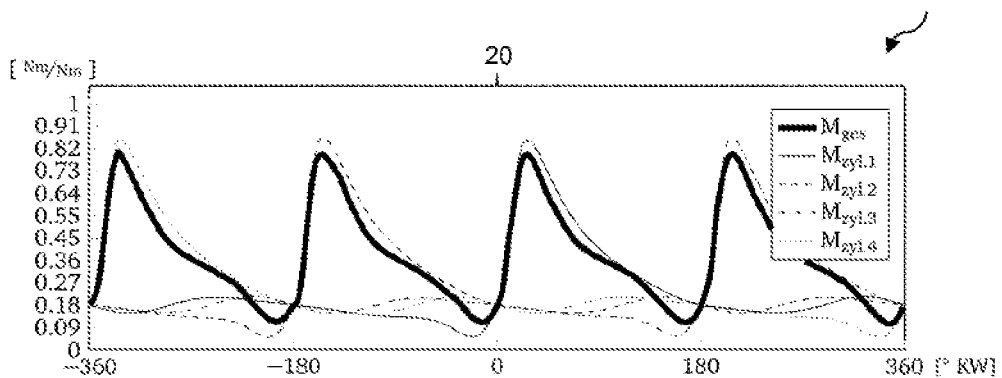

FIG. 1a illustrates an internal combustion engine 1 in its installation environment, wherein the internal combustion engine 1 is, in the example embodiment, a four-stroke engine with 4 cylinders Z1, Z2, Z3 and Z4.

Of the installation environment, the illustration of FIG. 1a shows the intake system 9 with the air filter LF at the air inlet, the exhaust-gas turbocharger ATL and a charge-air cooling arrangement and the air manifold LS in the direction of the cylinders Z. Also shown are potential leakage regions L at the pipelines between the various components. By way of example, a potential mechanical failure R at the piston and/or at the cylinder inner wall, which would potentially lead to greatly increased friction, is signaled at the cylinder Z1.

FIG. 1b illustrates the internal combustion engine 1 in a more detailed schematic view. The internal combustion engine 1 has the cylinders Z1, Z2, Z3 and Z4, wherein all the cylinders Z provide a torque contribution M to the crank drive KT. The internal combustion engine 1 additionally has a diagnostic tool 2 according to an example embodiment of the present subject matter, which diagnostic tool has a processing unit 4, a rotational speed acquisition unit 6 and optionally a pressure acquisition unit 7 for the reference pressures from surroundings and air manifold or crankcase. The optional pressure acquisition unit 7 operates by reading the values to be ascertained out of an operation model, for example of the engine controller.

From FIG. 1b, it can be seen inter alia that each cylinder Z can cyclically provide a torque contribution M to the crank drive KT in a manner dependent on the respective cylinder pressure p. The totality of the torque contributions results in a rotational speed n of a crankshaft of the crank drive KT which varies over time.

The present rotational speed n can be ascertained using the rotational speed acquisition unit 6 and the processing unit 4 and used by the diagnostic tool 2.

FIG. 1c illustrates an example torque profile 10 at the crank drive KT during normal operation at an operating point (rotational speed; load state) versus the crank angle KW. It can be seen that the torque contribution M originates from different cylinders Z in alternating fashion. Exactly one working cycle (=a KW range of 720°) of the four-cylinder engine 1, which is in the form of a four-stroke engine, is illustrated.

The illustrated working cycle corresponds, in the example embodiment, to a diagnosis time window 20 used for the ascertainment of the rotational speed profile 101 (cf. also FIG. 2a).

In the example embodiment, for the internal combustion engine 1 according to FIG. 1, the twelfth engine order MO12 (the engine orders are frequencies normalized versus the rotational speed, to be able to work with the same feature over the entire characteristic map range). The method described by way of example is optimized for 4-cylinder engines, though may possibly also be used, in analogously adapted form, for other numbers of cylinders. The basis for the diagnosis described in the example embodiment is the third multiple of the basic excitation frequency of the engine 1 (in relation to one working cycle=four strokes in the case of a four-cylinder four-stroke engine).

FIG. 2a illustrates a diagram with rotational speed developments 100 during a diagnosis time window 20. The diagram shows a rotational speed profile 101 that has been ascertained using the rotational speed acquisition unit 6. Furthermore, the diagram shows the rotational speed profile 101', which has been read out from an operation tool of the engine controller, where said rotational speed profile is stored, for the considered reference point of the engine at 3000 revolutions per minute and a defined load situation, as a deviation-typical rotational speed profile for the case of a leakage L in the intake air system.

In the context of the example method, the ascertained rotational speed profile 101 is furthermore compared with further rotational speed profiles which are stored in the operation model for other potential fault situations, which rotational speed profiles are however not illustrated in FIG. 2a for the sake of simplicity. The example embodiment will thus be described by way of example below for the identification of the deviation type of leakage L in the intake air system.

It can be seen from FIG. 2a that the ascertained rotational speed profile 101 and the deviation-typical rotational speed profile 101' differ from one another. To be able to better analyze the different profiles 101 and 101', the two profiles are subjected to a Fourier transformation using an FFT method or possibly using a DFT method.

FIG. 2b illustrates the result of these Fourier transformations in the form of an order analysis relating to the engine orders MO1 to MO¬25 versus the amplitude A. For each engine order, the ascertained amplitude AMO is illustrated by a triangle and the deviation-typical amplitude AMO' is illustrated by a circle.

From this, it is possible, in a comparison, to ascertain an amplitude difference ΔAMO=AMO-AMO'.

If this amplitude difference ΔAMO is greater than a threshold value which is fixed for the deviation type at the considered engine operating point (defined by the rotational speed n and the load situation we) and which is stored in the operation model, the example method yields, for the operating point under examination, the result that the corresponding deviation type is present.

Figure 2:
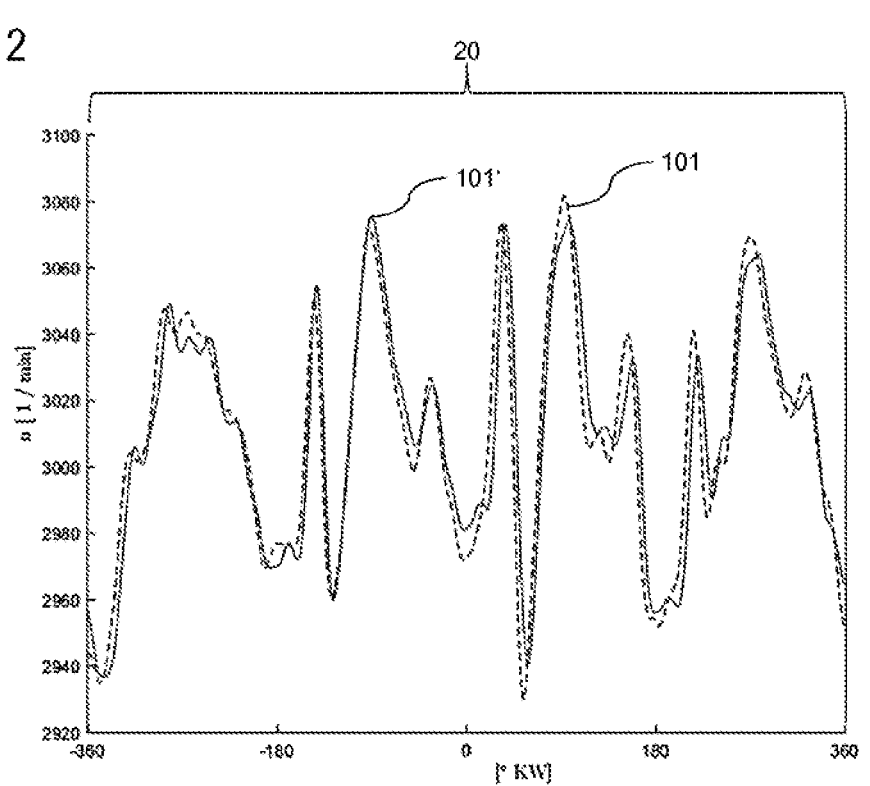
FIGS. 2a-2b show a rotational speed profile of the engine as per FIG. 1a (see FIG. 2a).
Figure 2:
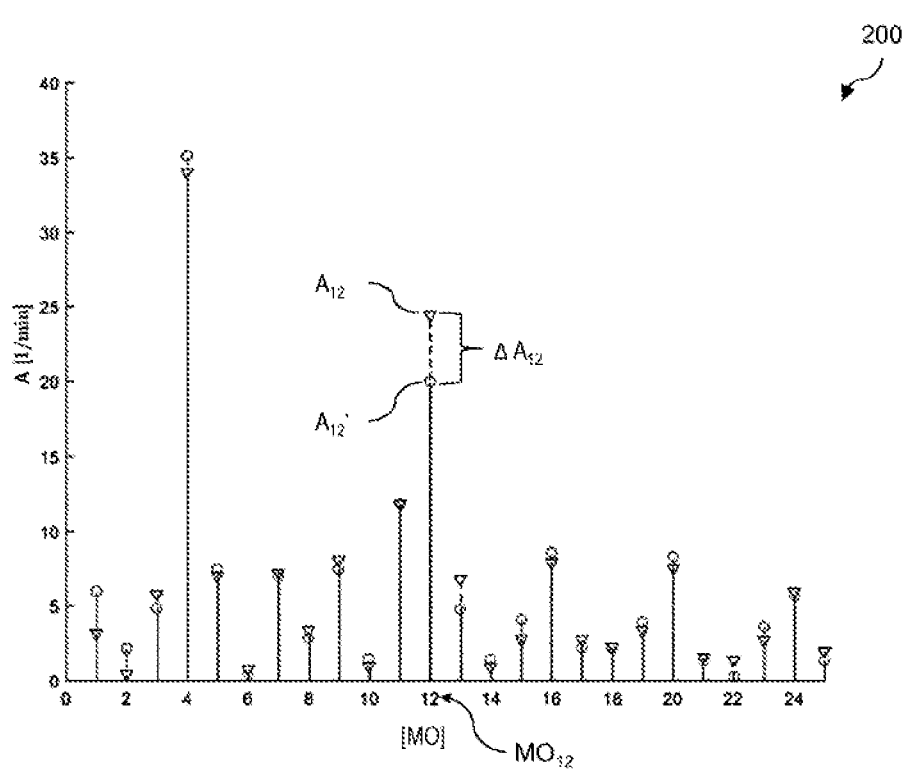

In the example embodiment illustrated in FIG. 2, the twelfth engine order MO12 is correspondingly examined in the order analysis 200. For this engine order, the amplitude difference is calculated as ΔA12=A12−A12'. If ΔA12 is greater than the threshold value, fixed for the operating situation, regarding the deviation type of a leakage L in the intake air system, the engine 1 is assigned the deviation type L for this operating point.

Figure 3:
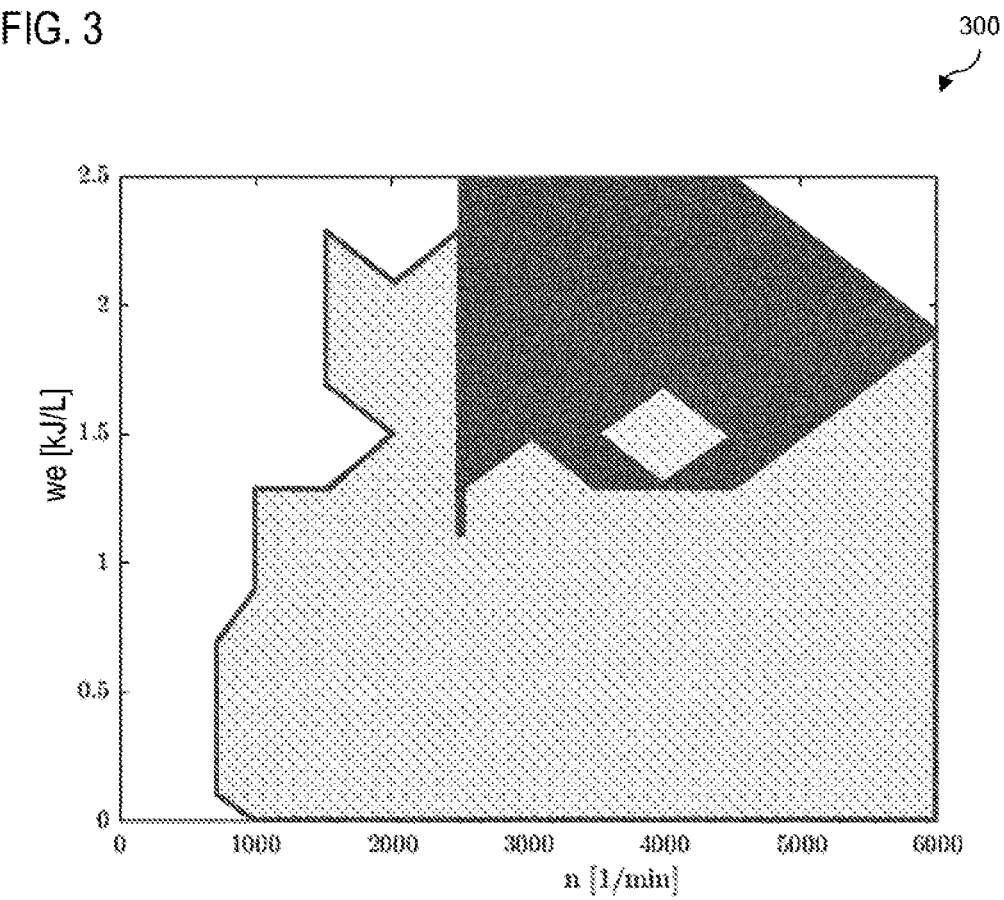
FIG. 3 shows a diagnosis characteristic map versus the engine load and the engine rotational speed, in which diagnosis characteristic map a range of a threshold value exceedance with respect to the amplitude difference plotted in FIG. 2b is indicated.

FIG. 3 illustrates a diagnostic characteristic map 300 for the twelfth engine order MO12 regarding the identification of the deviation type L, broken down according to operating points, which are defined by a combination of the rotational speed n under examination and the load situation we under examination. For the engine operating points in the region of the characteristic map 300 stored with dark coloring, the amplitude difference ΔA12 is greater than the threshold value, such that the deviation type L is identified. For the engine operating points in the region of the characteristic map 300 stored with light coloring, the amplitude difference is smaller than the threshold value, such that the deviation type is not identified.

The illustration of FIG. 3 shows an evaluation over multiple diagnosis time windows 20 over the entire characteristic map, wherein, for the considered multiplicity of method implementations, the statistical significance of the illustrated results is considerably increased by applying a t-test. The effect of outliers on the illustrated results is thus almost eliminated.

The described order analysis using FFT transformation may be performed analogously for each working cycle or for each revolution (correspondingly twelfth or sixth order in the case of four-cylinder engines) and, on the one hand, compared with stored knowledge from a lookup table from an operation model, for example of the engine controller. Alternatively, using a rotational speed simulation, the residual between measured and simulated variable may be compensated. In the event of exceedance of the threshold value, a fault is present, analogously to the above description, which fault can be assigned to the deviation type of a leakage.

For use in the case of other engines, it is possible, in accordance with example methods analogous to this example, and with otherwise analogous application, to analyze the respectively corresponding multiple of the base excitation order of the engine, in particular the sixth order (two-cylinder engine), the ninth order (three-cylinder engine with four strokes in the working cycle) or the 18th order (six-cylinder four-stroke engine, resolved by working cycle).

LIST OF REFERENCE DESIGNATIONS

1 Internal combustion engine
2 Diagnostic tool
4 Processing unit
6 Acquisition unit for the rotational speed of the crankshaft
7 Pressure acquisition unit
9 Intake system
10 Torque profile of the internal combustion engine over one engine cycle
20 Diagnosis time window
100 Diagram of rotational speed development
101 Rotational speed profile
A Amplitude relating to an engine order
ΔA Amplitude difference
ATL Exhaust-gas turbocharger
KT Crank drive
KW Crank angle
L Potential leakages
LF Air filter
LS Air manifold
M Torque of a cylinder in FIG. 1
MO Engine order
n Rotational speed
p Cylinder pressure in FIG. 1
R Potential mechanical fault as a result of piston/cylinder friction
we Load situation [kj/L]
Z Cylinder.

What is claimed is:

1. A method for diagnosing charge exchange behavior of an internal combustion engine with multiple cylinders, comprising:
ascertaining a rotational speed profile of the internal combustion engine;
ascertaining one or more amplitudes corresponding to each one or more engine orders using a Fourier transformation from the ascertained rotational speed profile;
comparing the one or more amplitudes with predetermined amplitudes assigned to different deviation types, wherein the comparing comprises:
calculating an amplitude difference between the one or more ascertained amplitudes and one or more of the predetermined amplitudes, and
ascertaining that the amplitude difference is greater than a threshold value; and
assigning a deviation type to the rotational speed profile as a result of the ascertaining that the amplitude difference is greater than the threshold value in accordance with the result of the comparing.

2. The method according to claim 1, wherein the Fourier transformation is a DFT and/or FFT calculation.

3. The method according to claim 1, further comprising:
ascertaining the rotational speed profile during a diagnosis time window, which corresponds to at least one working cycle of the internal combustion engine.

4. A diagnostic tool for diagnosing charge exchange behavior of an internal combustion engine with multiple cylinders, the diagnostic tool comprising:
   a rotational speed acquisition unit to acquire a rotational speed of a crankshaft of the internal combustion engine; and
   a processor configured to:
      control the rotational speed acquisition unit;
      ascertain one or more amplitudes corresponding to each of one or more engine orders using a Fourier transformation from an ascertained rotational speed profile;
      compare the one or more amplitudes with predetermined amplitudes assigned to different deviation types, wherein the comparing comprises:
         calculating an amplitude difference between the one or more ascertained amplitudes and one or more of the predetermined amplitudes, and
         ascertaining that the amplitude difference is greater than a threshold value; and
      assign a deviation type to the rotational speed profile as a result of the ascertaining that the amplitude difference is greater than the threshold value in accordance with the result of the comparing.

5. An internal combustion engine with multiple cylinders comprising the diagnostic tool of claim 4.

6. The method of claim 1, further comprising:
   comparing the ascertained rotational speed profile with a plurality of deviation-typical rotational speed profiles; and
   subjecting the ascertained rotational speed profile and at least one of the deviation-typical rotational speed profiles to the Fourier transformation.

7. The diagnostic tool according to claim 4, wherein the processor is further configured to:
   compare the ascertained rotational speed profile with a plurality of deviation-typical rotational speed profiles; and
   subject the ascertained rotational speed profile and at least one of the deviation-typical rotational speed profiles to the Fourier transformation.

8. The method according to claim 1, wherein
the different deviation types include at least one selected from the group consisting of:
   insufficient charging of a cylinder with fresh air and/or recirculated exhaust gas;
   excessive charging of the cylinder with fresh air and/or recirculated exhaust gas;
   insufficient compression of the cylinder;
   excessive mechanical friction in the cylinder; and
   premature ignition of the cylinder, and
a plurality of different threshold values are each assigned to the different deviation types for different operating points of the internal combustion engine.

9. The method according to claim 1, wherein
the threshold value is fixed for the deviation type at an engine operating point.

10. The method of claim 9, wherein
the engine operating point is defined by a rotational speed and a load situation of the internal combustion engine.

11. The diagnostic tool according to claim 4, wherein
the threshold value is fixed for the deviation type at an engine operating point.

12. The method of claim 1, further comprising:
subjecting the rotational speed profile to the Fourier transformation prior to the calculating of the difference between the ascertained one or more amplitudes and the one or more predetermined amplitudes.

13. The diagnostic tool according to claim 4, wherein
the different deviation types include at least one selected from the group consisting of:
   insufficient charging of a cylinder with fresh air and/or recirculated exhaust gas;
   excessive charging of the cylinder with fresh air and/or recirculated exhaust gas;
   insufficient compression of the cylinder;
   excessive mechanical friction in the cylinder; and
   premature ignition of the cylinder, and
a plurality of different threshold values are each assigned to the different deviation types for different operating points of the internal combustion engine.

14. The diagnostic tool according to claim 4, wherein the processor is further configured to:
   ascertain the rotational speed profile during a diagnosis time window, which corresponds to at least one working cycle of the internal combustion engine.

15. The diagnostic tool according to claim 11, wherein
the engine operating point is defined by a rotational speed and a load situation of the internal combustion engine.

16. The diagnostic tool according to claim 4, wherein the processor is further configured to:
   subject the rotational speed profile to the Fourier transformation prior to the calculating of the difference between the ascertained one or more amplitudes and the one or more predetermined amplitudes.

\* \* \* \* \*